United States Patent
Holmes et al.

(10) Patent No.: US 8,553,874 B2
(45) Date of Patent: *Oct. 8, 2013

(54) DISPLAY COVER AND CASE FOR A COMMUNICATION DEVICE

(75) Inventors: John Holmes, Waterloo (CA); Felipe Simoes, Kitchener (CA); Larry Hawker, Wateloo (CA)

(73) Assignee: Blackberry Limited, Waterloo, Ontario ( * ) Notice: Subject to any disclaimer, the term of this patent is extended or adjusted under 35 U.S.C. 154(b) by 21 days.

This patent is subject to a terminal disclaimer.

(21) Appl. No.: 13/170,748

(22) Filed: Jun. 28, 2011

(65) Prior Publication Data

US 2011/0261951 A1    Oct. 27, 2011

Related U.S. Application Data

(63) Continuation of application No. 12/109,925, filed on Apr. 25, 2008, now Pat. No. 7,991,148, which is a continuation of application No. 10/856,808, filed on Jun. 1, 2004, now Pat. No. 7,409,058.

(51) Int. Cl.
*H04M 1/00* (2006.01)
*H04M 9/00* (2006.01)

(52) U.S. Cl.
USPC ................................ 379/433.02; 379/433.04

(58) Field of Classification Search
USPC ....................... 379/433.01–433.04, 447, 455;
455/550.1, 575.1–575.8, 566
See application file for complete search history.

(56) References Cited

U.S. PATENT DOCUMENTS

| | | |
|---|---|---|
| 5,768,370 A | 6/1998 | Maatta et al. |
| 6,321,070 B1 | 11/2001 | Clark et al. |
| 6,553,119 B1 | 4/2003 | Mori |
| 6,594,472 B1 | 7/2003 | Curtis et al. |
| D479,233 S | 9/2003 | Griffin |
| 6,807,433 B2 | 10/2004 | Oota et al. |
| 6,847,806 B2 | 1/2005 | Curtis et al. |

(Continued)

FOREIGN PATENT DOCUMENTS

| | | |
|---|---|---|
| FR | 2798541 A1 | 9/1999 |
| GB | 2318476 A1 | 4/1998 |

(Continued)

OTHER PUBLICATIONS

Canadian Intellectual Property Office, "Office Action," issued in connection with Canadian application serial No. 2,507,674, issued Jan. 11, 2012, 3 pages.

(Continued)

*Primary Examiner* — Mohammad Islam
*Assistant Examiner* — Phylesha Dabney
(74) *Attorney, Agent, or Firm* — Hanley, Flight & Zimmerman, LLC.

(57) ABSTRACT

A cover system for a communication device and a case for the communication device are provided. The system comprises: a first cover and a second cover. The first cover has a shape to fit in a recessed region of a case of a communication device, the recessed region bounding a display opening and a speaker opening in the case; a first region adapted to cover the display opening; a second region to enclose the speaker opening; and at least one hole in the second region to provide a conduit through the first cover to the speaker opening. The second cover covers the second region and is shaped to allow ambient air to pass around the second cover to the at least one hole.

18 Claims, 5 Drawing Sheets

(56) References Cited

U.S. PATENT DOCUMENTS

| | | | |
|---|---|---|---|
| 7,409,058 | B2 | 8/2008 | Holmes et al. |
| 7,991,148 | B2 | 8/2011 | Holmes et al. |
| 2001/0017663 | A1 | 8/2001 | Yamaguchi et al. |
| 2004/0077385 | A1 | 4/2004 | Makino et al. |
| 2004/0102231 | A1 | 5/2004 | Nuovo et al. |
| 2005/0221867 | A1 | 10/2005 | Zurek et al. |
| 2005/0265574 | A1 | 12/2005 | Holmes et al. |
| 2008/0199038 | A1 | 8/2008 | Holmes et al. |

FOREIGN PATENT DOCUMENTS

| | | |
|---|---|---|
| KR | 1020010070355 | 7/2001 |
| KR | 1020020087847 | 11/2002 |
| WO | WO 02/34006 A2 | 4/2002 |
| WO | WO 2004/054211 A1 | 6/2004 |

OTHER PUBLICATIONS

United States Patent and Trademark Office, "Notice of Allowance," issued in connection with U.S. Appl. No. 10/856,808, mailed Apr. 18, 2008, 11 pages.
United States Patent and Trademark Office, "Notice of Allowance," issued in connection with U.S. Appl. No. 10/856,808, mailed Jan. 10, 2008, 12 pages.
United States Patent and Trademark Office, "Final Office Action," issued in connection with U.S. Appl. No. 10/856,808, mailed Nov. 1, 2007, 9 pages.
United States Patent and Trademark Office, "Non-Final Office Action," issued in connection with U.S. Appl. No. 10/856,808, mailed May 21, 2007, 9 pages.
United States Patent and Trademark Office, "Non-Final Office Action," issued in connection with U.S. Appl. No. 10/856,808, mailed Jan. 12, 2007, 10 pages.
United States Patent and Trademark Office, "Notice of Allowance," issued in connection with U.S. Appl. No. 12/109,925, mailed Mar. 24, 2011, 12 pages.
United States Patent and Trademark Office, "Non-Final Office," issued in connection with U.S. Appl. No. 12/109,925, mailed Sep. 29, 2010, 15 pages.
Intellectual Property Office of Singapore, "Notification of Grant," issued in connection with Singapore Application No. 200503184-4, dated Feb. 29, 2008, (2 pages).
Government of India Patent Office, "First Examination Report," issued in connection with Indian Application No. 1309/DEL/2005, dated May 22, 2007, (2 pages).
Canadian Intellectual Property Office, "Office Action," issued in connection with Canadian Application No. 2,507,674, dated Jan. 27, 2009, (2 pages).
State Intellectual Property Office of People's Republic of China, "First Office Action," issued in connection with Chinese Application No. 200510074688.9, dated Oct. 12, 2007, original and translated copies, (18 pages).
State Intellectual Property Office of People's Republic of China, "Second Office Action," issued in connection with Chinese Application No. 200510074688.9, dated Mar. 28, 2008, original and translated copies, (7 pages).
State Intellectual Property Office of People's Republic of China, "Third Office Action," issued in connection with Chinese Application No. 200510074688.9, dated Sep. 12, 2008, original and translated copies, (11 pages).
State Intellectual Property Office of People's Republic of China, "Notification of Grant of Rights for Invention Patent," issued in connection with Chinese Application No. 200510074688.9, dated Feb. 24, 2011, (8 pages).
State Intellectual Property Office of People's Republic of China, "Certificate of Invention Patent," issued in connection with Chinese Application No. 200510074688.9, dated Jun. 22, 2011, (3 pages).
European Patent Office, "Combined Search Report and Examination Report," issued in connection with European Application No. 04102445.6, dated Nov. 11, 2004, (9 pages).
European Patent Office, "Certificate of Grant," issued in connection with European Patent No. 1603308, dated Nov. 6, 2011, (1 page).
European Patent Office, "Combined Search Report and Examination Report," issued in connection with European Application No. 06123708.7, dated May 2, 2007, (6 pages).
European Patent Office, "Communication Pursuant to Article 94(3) EPC," issued in connection with European Application No. 06123708.7, dated Jul. 31, 2008, (5 pages).
European Patent Office, "Communication Under Rule 71(3) EPC," issued in connection with European Application No. 06123708.7, dated Jan. 26, 2010, (7 pages).
European Patent Office, "Certificate of Grant," issued in connection with European Patent No. 1750419, dated Jul. 21, 2010, (1 page).
Government of India Patent Office, "Certificate of Grant," issued in connection with Indian Application No. 1309/DEL/2005, dated Jul. 17, 2008, (1 page).
State Intellectual Property Office of People's Republic of China, "Rejection Decision," issued in connection with Chinese Application No. 200510074688.9, dated Apr. 3, 2009, translated copy, (7 pages).
Canadian Intellectual Property Office, "Office Action," issued in connection with Canadian Application No. 2,507,674, dated May 14, 2013, (2 pages).

DISPLAY COVER AND CASE FOR A COMMUNICATION DEVICE

RELATED APPLICATION

This application is a U.S. continuation patent application of U.S. patent application Ser. No. 12/109,925 filed on Apr. 25, 2008 now U.S. Pat. No. 7,991,148, which itself is a U.S. continuation patent application of U.S. Pat. No. 7,409,058 (having U.S. application Ser. No. 10/856,808 filed on Jun. 1, 2004).

FIELD OF DISCLOSURE

The disclosure relates to a cover and a case for a display, in particular a display cover and a related case for a communication device, such as a portable phone.

BACKGROUND

Typical voice communication devices, such as cellular phones, have a receiver transducer (speaker) located at a top portion of the device and a transducer (microphone) located at the bottom portion.

In designing a communication device, the speaker must be mounted within an enclosure. Typically, the enclosure is a plastic injection moulded piece. To fix the speaker within the enclosure, the top of the enclosure is frequently designed to provide a cover for the speaker. However, this approach limits aesthetic possibilities for the device as there are limitations to colour and texture treatments available for plastics typically used in casings.

There is a need for a display cover which provides an improvement over the prior art.

SUMMARY

In a first aspect, a cover system is provided. The system comprises: a first cover and a second cover. The first cover has a shape to fit in a recessed region of a case of a communication device, the recessed region bounding a display opening and a speaker opening in the case; a first region adapted to cover the display opening; a second region to enclose the speaker opening; and at least one hole in the second region to provide a conduit through the first cover to the speaker opening. The second cover covers the second region and is shaped to allow ambient air to pass around the second cover to the at least one hole.

In the system, the first cover may not cover an opening for a keypad in the case.

In the system, the first cover may define a sound hole located about the second region, the sound hole extending from the top surface through the first cover to the bottom surface and connecting to the enclosure cavity; and the second cover may further be shaped to allow passage of air from above the second cover to the sound hole.

In the system, the second region may have a recess extending inwardly from the top surface into the first cover.

In the system, the recess may have a hexagonal shape.

In the system, the second cover may be shaped to fit the recess.

In a second aspect, a case for a communication device is provided. The case comprises a frame having sides and an internal wall spanning between the sides. The frame has a shape defining a first opening for a speaker and a second opening for a display, where the first and second openings are separated by the internal wall. The frame further defines a first cavity providing acoustic tuning for the speaker and the internal wall further defines a second cavity about the second opening providing further acoustic tuning for the speaker.

In the case, in the frame, the internal wall may further define an air channel connecting the first cavity to the second cavity.

In the case, the frame may further define a second air channel connecting the first cavity to a region below the speaker.

In the case, the second opening may be covered by a printed circuit board (PCB) when the PCB is assembled with the frame.

In the case, the first cavity may be a Helmholtz cavity.

The case may further comprise a recess running around the first and the second openings.

The case may further comprise a first cover providing a part of a front face of the communication device.

In the case, the first cover may have: a shape to fit in the recess; a first region adapted to cover the first opening; a second region to enclose the second opening; and at least one hole in the first region to provide a conduit through the first cover to the speaker opening.

The case may further comprise a second cover for covering the first region.

In the case, the first cover may define a sound hole located about the first region; and the second cover may be further shaped to allow passage of air from above the second cover to the sound hole.

In the case, the first region may have a recess extending inwardly from a top surface into the first cover.

In the case, the recess may have a hexagonal shape.

In the case, the second cover may be shaped to fit the recess.

In another aspect, a cover for a display device for a communication device is provided. The cover comprises: external dimensions shaped to fit the cover in a case for the communication device; a top surface; a bottom surface; a non-opaque region to cover the display device allowing a user to see the display device; and a region defining a top of an enclosure cavity for a speaker associated with the communication device.

The cover may have at least one sound hole located about the region. The sound hole extends from the top surface through the cover to the bottom surface and connects to the enclosure cavity.

In the cover, the region may have a recess extending inwardly from the top surface into the cover. Further, a second cover may be provided to fit over the region. The second cover is shaped to allow passage of air from above the cover to the sound hole.

In yet another aspect, an enclosure system for a communication device is provided. The enclosure comprises a case for enclosing elements of the communication device. The case has an opening for a display for the device in a first region and a structure to support a speaker for the device in a second region. The enclosure has a cover adapted to mate with the case. The cover has a top surface; a bottom surface; a non-opaque region adapted to cover the display device allowing a user to see the display device; and a support region for defining a top enclosure for a speaker associated with the device.

In the system, the cover may have at least one sound hole located in a region about the second region. The hole extends from the top surface through the cover to the bottom surface.

The system may have a second cover shaped to fit into the region and shaped to allow air access to the at least one sound hole from above the cover.

In the system, the case may have at least one cavity located about the structure; and an air channel to connect the cavity to the second region, such that the cavity is shaped to provide acoustic tuning for the speaker.

In still another aspect, a handheld communication device is provided. The device comprises: speaker; a display device; a housing having an opening to allow viewing of the display device therethrough; a second opening to allow placement of the speaker therein; and a cover being fixedly mountable to the housing. The cover has a first portion for covering the display device and a second portion adapted to acoustically transmit sound from the speaker.

In the device, a second cover may be provided which may be shaped to fit into the second portion and shaped to allow air to access at least one sound hole, which is located in the second portion, from above the cover.

In the device, the housing may further have a first cavity to provide acoustic tuning for the speaker, and an air channel connecting the first cavity to a region above the speaker. In the device, the first cavity may span both sides of the second opening.

In the device, the housing may further have a second cavity to provide acoustic tuning for the speaker, and a second air channel connecting the second cavity to a region below the speaker. In the device, the second cavity may span both sides of the second opening.

In the device, the housing may further have a third cavity to provide acoustic tuning for the speaker in combination with the first and the second cavities, and a third air channel connecting the second and third cavities.

In other aspects various combinations of sets and subsets of the above aspects are provided.

BRIEF DESCRIPTION OF THE DRAWINGS

The foregoing and other aspects of the disclosure will become more apparent from the following description of specific embodiments thereof and the accompanying drawings which illustrate, by way of example only, the principles of the disclosure. In the drawings, where like elements feature like reference numerals (and wherein individual elements bear unique alphabetical suffixes).

DETAILED DESCRIPTION OF AN EMBODIMENT

The description which follows, and the embodiments described therein, are provided by way of illustration of an example, or examples, of particular embodiments of the principles of the present disclosure. These examples are provided for the purposes of explanation, and not limitation, of those principles and of the disclosure. In the description, which follows, like parts are marked throughout the specification and the drawings with the same respective reference numerals.

Figure 1A:
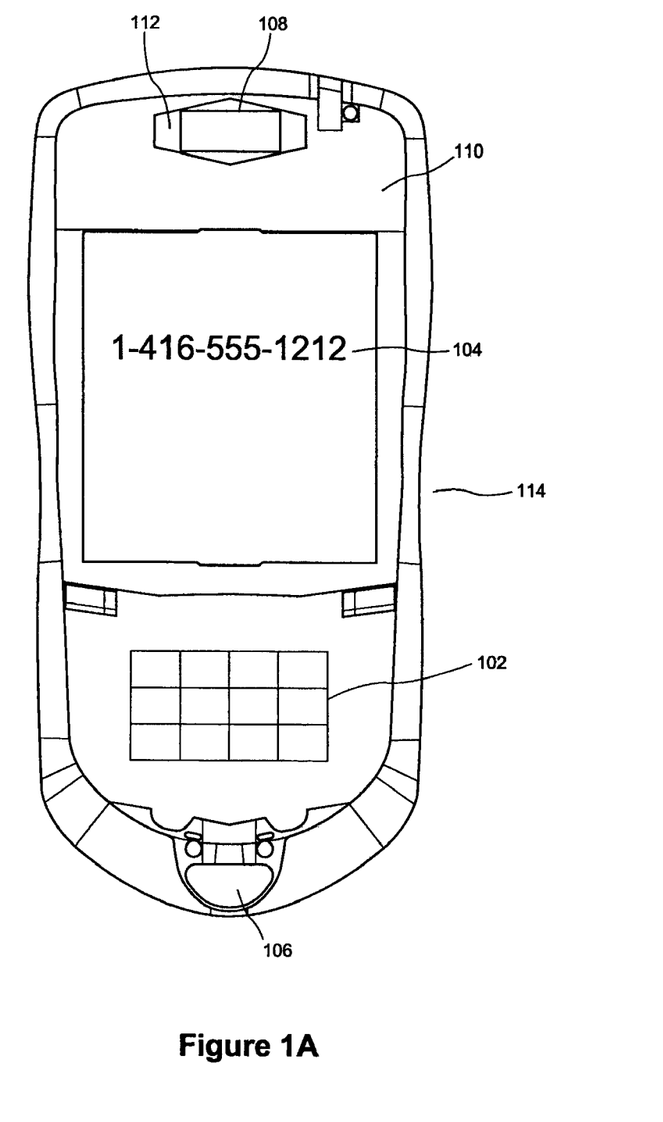
FIG. 1A is a top plan view of a communication device associated with an embodiment.
Figure 1B:
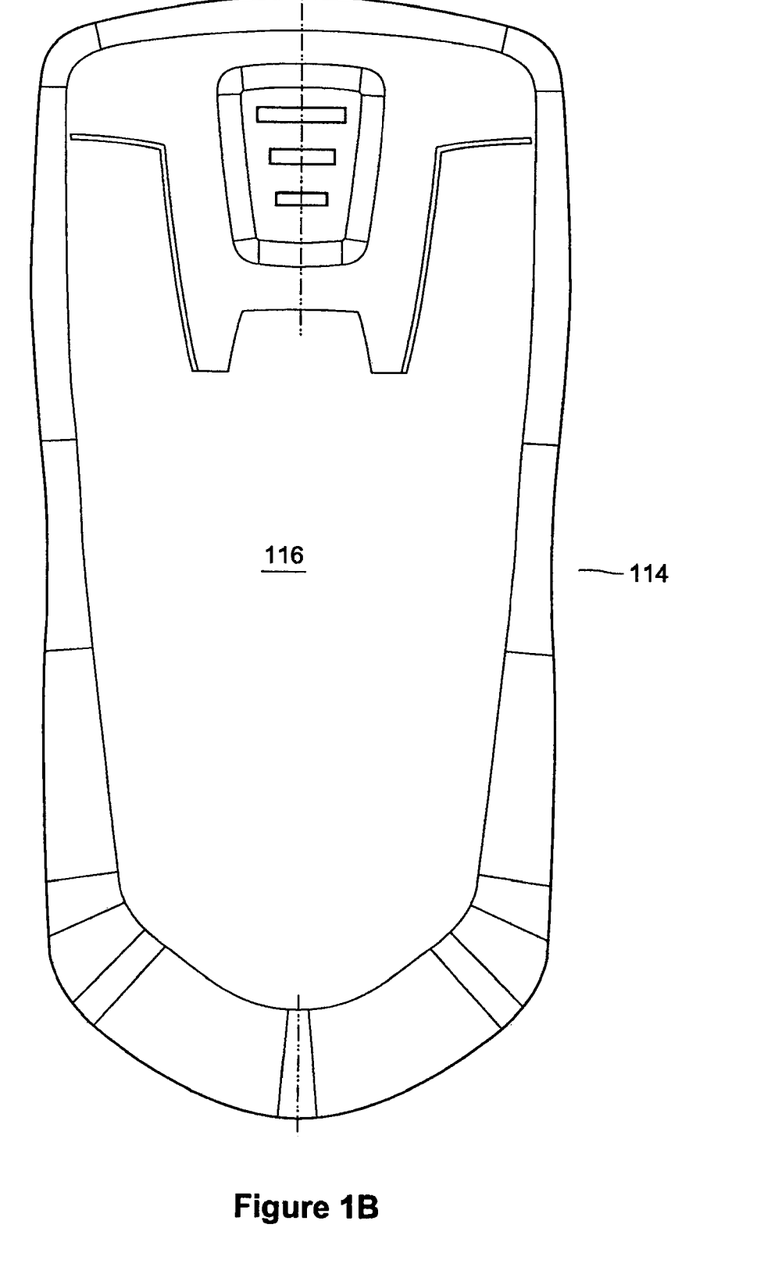
FIG. 1B is a bottom plan view of the communication device of FIG. 1A.

Referring to FIGS. 1A and 1B, communication device 100 is shown. In the embodiment, communication device 100 provides voice communications with other devices, allowing the user to hear audio signals (e.g. voices) transmitted from another device (e.g. a cellular phone). Device 100 may be a telephone, a cordless telephone, a cellular telephone, a voice-enabled personal digital assistant (PDA) or any other voice communication device. Communications may be provided via wireless systems, wired systems or a combination of both systems. As is common with voice communication devices, device 100 has a keypad 102, display 104, microphone 106 and transducer 108, i.e. speaker 108 all contained within an enclosure. Display 104 is an LCD device. Display cover 110 provides a transparent, translucent or non-opaque physical cover for the viewing area of display 104 and extends beyond it. Speaker cover 112 covers a recess in display cover 110. The recess is located above the installation location of speaker 108. Case 114 provides a physical enclosure for the electronics and mechanical elements for device 100. Back of case 114 is shown in FIG. 1B as bottom case section 116. General internal circuits and operations of device 100 are well known in the art and are not provided here.

Device 100 provides voice communications for a user in a familiar interface. To initiate a call, the user activates device 100, enters a telephone number to be called on keypad 102 and initiates the call. After the call is connected, the user places device 100 about his mouth and one of his ears, such that microphone 106 is near his mouth and speaker 108 is near his ear. User speaks towards microphone 106 and listens for sounds from the called party through speaker 108.

Figure 2:
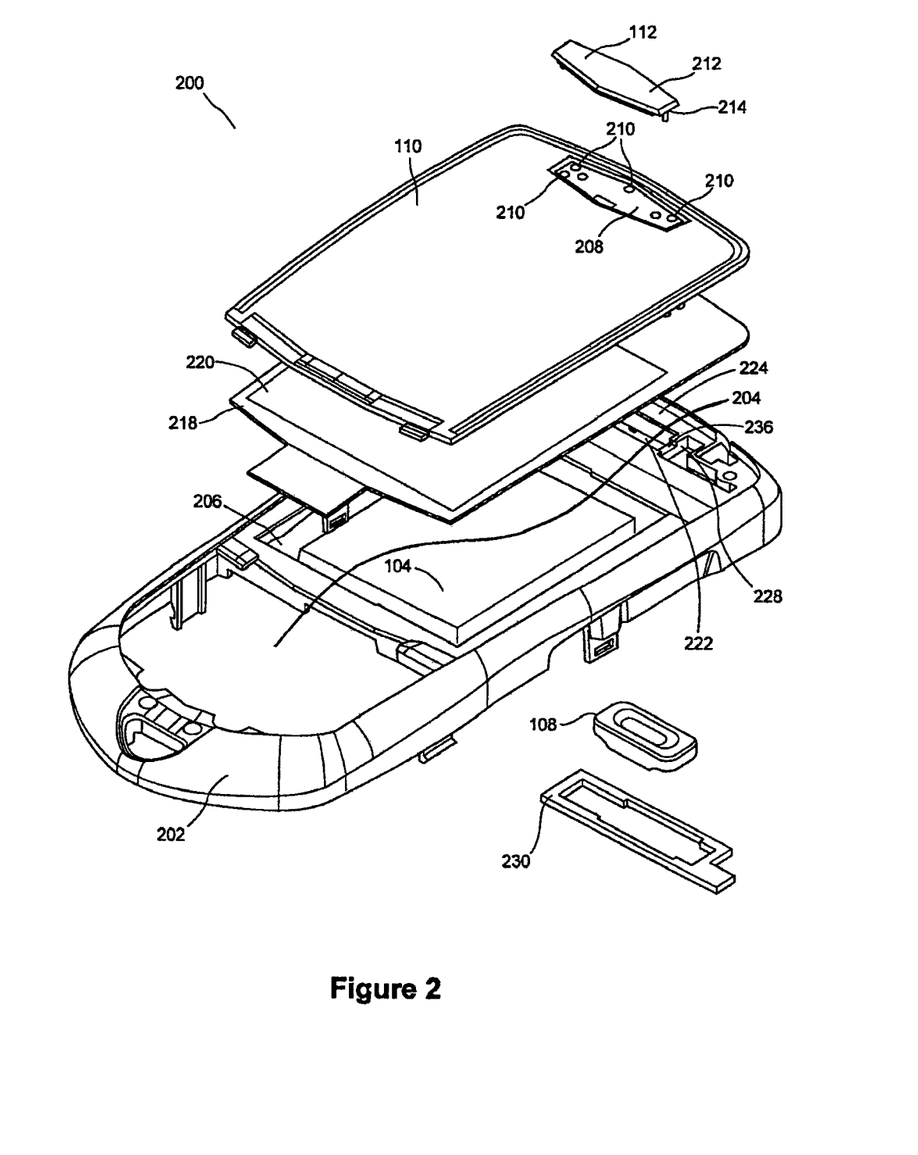
FIG. 2 is a top exploded perspective view of selected internal components and a case section of the communication device of FIGS. 1A and 1B.
Figure 3:
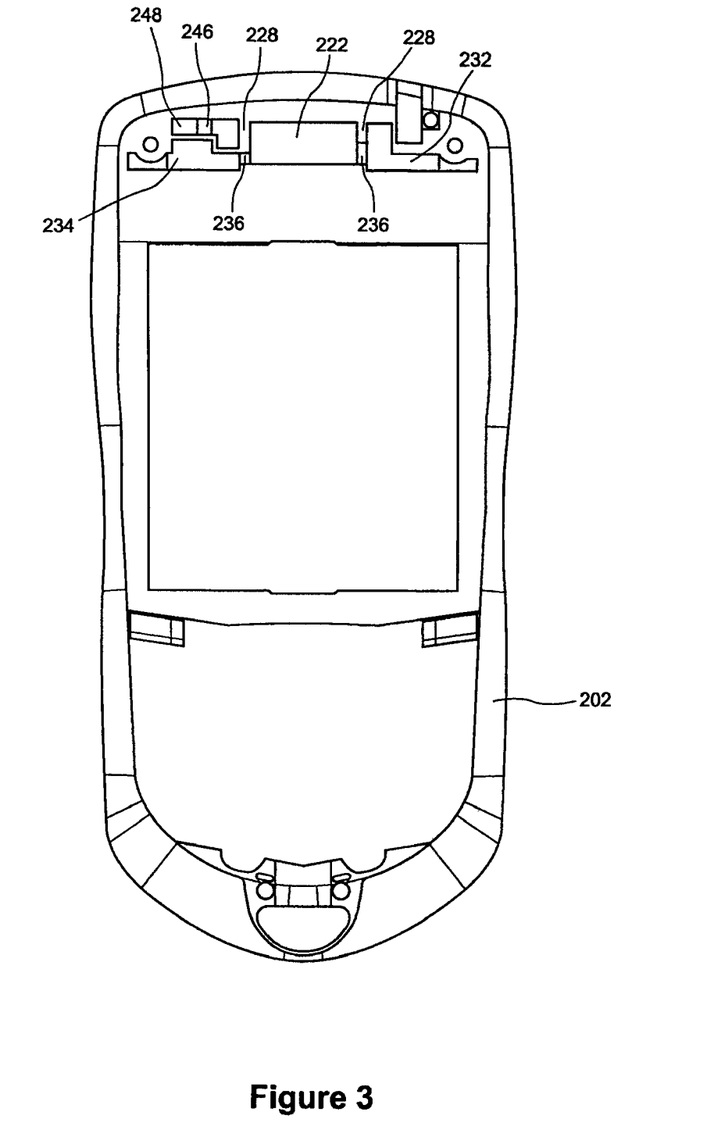
FIG. 3 is a top plan view of the case section of the communication device of FIG. 2.
Figure 4:
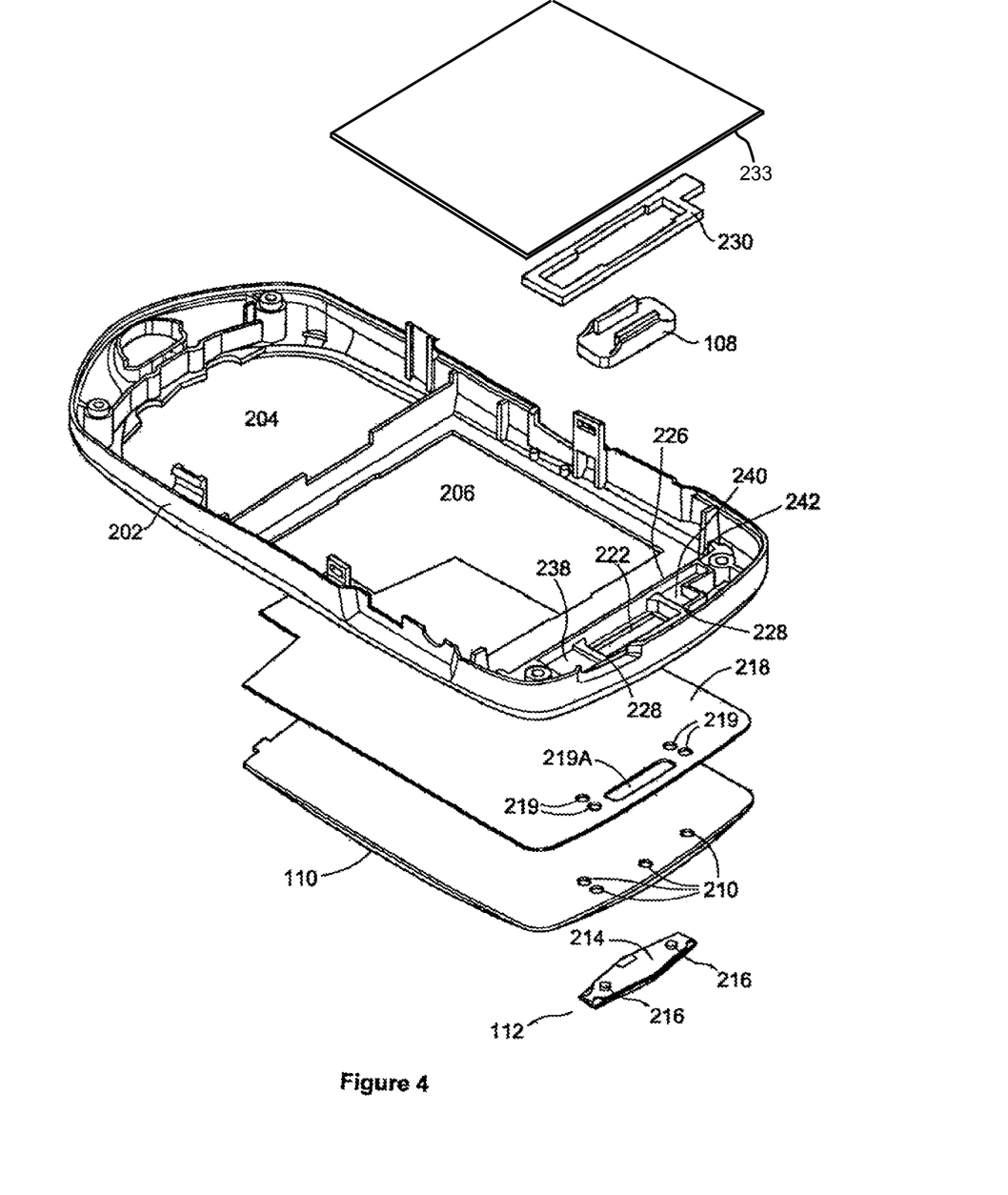
FIG. 4 is a bottom exploded perspective view of the selected internal components and the case section of FIG. 2.

Referring collectively to FIGS. 2, 3 and 4, view 200 provides an exploded top perspective view of internal and external elements in an upper portion of device 100. In particular, case 114 is comprised of top case section 202 and bottom case section 116 (FIG. 1B). Top case section 202 provides a one-piece cover for internal elements of device 100. Top case section 202 mates with bottom case section 116 along their respective sides. Various dimensions and fitting interfaces between top case section 202 and bottom case section 116 may be provided in other embodiments, including those known in the art. For example, alternative top and bottom case sections may generally have an exterior form as described in U.S. Design Pat. No. D479,233, which is incorporated herein by reference. Generally, top case section 202 is shaped to define the front face of device 100 and the top portion of the exterior edge of case 114. Top section 202 also provides internal bracing for structural support for device 100 and has two openings in its front face: opening 204 allows access to keypad 102 and opening 206 allows viewing of LCD 104. Top case section 202 is preferably a plastic moulded injected casing.

Display area of LCD 104 is covered by display cover 110, which fits into a recessed region shaped to receive cover 110 in the front of case section 202; however, display cover 110 further extends upwardly above LCD 104 to the top edge of case section 202. As such, display cover 110 provides a single seamless structure to cover both LCD 104 and speaker 108. Accordingly, case section 202 does not have to provide a top cover for speaker 108. Advantageously, display cover 110 may be silk screened with custom lettering or graphics around display area of LCD 104 and around the area where speaker 108 is located. For acoustic purposes, display cover 110 may be made of almost any material (such as plastic), as long as the material facilitates accurate manufacturing of display cover 110 and provides a transparent, translucent or non-opaque region where display 104 will be placed underneath.

Further detail is provided on the acoustic interface between speaker 108 and display cover 110. At a top region of display cover 110, recess 208 is provided, which is a shaped contour extending inwardly within display cover 110. In the embodiment, recess 208 is a hexagonal polygon depression having a generally stunted-hexagonal shape. The floor of recess 208 is generally flat. The exterior edges of recess 208 are bevelled downward to the floor. In other embodiments, other shapes may be provided for a recess. Recess 208 has four sound holes 210 therein which provide air conduits through display cover 110. As such, holes 210 allow passage of acoustic energy from speaker 108 through display cover 110 to the ambient environment outside device 100. Two sounds holes 210 are located in the upper and lower corners of the left side of recess 208, a third sound hole 210 is located in the upper corner of the right side of recess 208, and the fourth sound hole 210 is located in the upper area about the center of the recess 208. In other embodiments, more or less sound holes may be used. A sound hole has acoustics properties determined, in part, by its dimensions, including its diameter (i.e. cross-sectional area) and length (i.e. thickness of display cover 110 in recess area 208). In this embodiment, sound holes 210 are cylindrical in shape with round openings. Other shapes and cross sections may be used. While both dimensions are important for acoustic purposes, it is possible to adjust them together to achieve a particular acoustic characteristic. In other embodiments, the device may have other systems to port the sound energy from its speaker, thereby eliminating a need for sound holes.

Speaker cover 112 is shaped to fit within recess 208. As such in the embodiment, cover 112 is a stunted hexagonal shape. Speaker cover 112 provides a cover for sound holes 210, thereby enhancing the aesthetic appearance of display cover 110. Speaker cover 112 comprises upper section 212 and lower section 214. The bottom surface of lower portion 214 fits snugly against the upper surface of recess 208. The shape of upper section 212 and lower section 214 provide a corresponding excised notch where each sound hole 210 is located, to allow sound to emit from sound holes 210 into the ambient environment of device 100. The exterior edge of speaker cover 112 has an inward ridge which is shaped to provide a gap between speaker cover 112 and the bevelled edge of recess 208, when speaker cover 112 is located in recess 208. Speaker cover 112 also has nubs thereon protruding downward from its bottom surface. Within recess 208, corresponding concave depressions in locations opposite of the nubs are provided. Nubs 216 in speaker cover 112 fit cooperatively within depressions in recess 208 to assist in aligning speaker cover 112 within recess 208. Preferably, speaker cover 112 has a thickness such that when it is placed in recess 208, its upper surface is either flush or roughly flush with the top surface of cover 110.

It will be appreciated that in other embodiments, no recess is provided for the sound holes. Further, in other embodiments no cover is provided.

In order to secure display cover 110 to case section 202, adhesive display cover tape 218 is provided and is located between LCD 104 and display cover 110. Display cover tape 218 has double-sided adhesive thereon to affix its top surface to the bottom surface of display cover 110 and to affix its bottom surface to the top surface of case section 202. Display cover tape 218 is excised in area 220 so as to not obstruct view of LCD 104. For aesthetics, cover tape 218 is black, which enhances concealing of plastics elements beneath it and outlining of the display area of LCD 104. Display cover tape 218 has a transparent layer attached in area 220. After attaching tape 218 to display cover 110, the transparent layer is removed using a pull tab. Holes 219 and 219A are provided in tape 218 to allow continuity for an air channel between holes 210 and the interior of device 100. Hole 219A is an oblong opening and it located to be in line with sound hole 210 located in the upper middle region of recess 208. Four holes 219 are provided in a symmetric pattern about hole 219A to provide openings for the three sound holes 210 located on the exterior ends of recess 208. As such, tape 218 has a symmetric orientation of holes 219 thereon. As such, if tape 218 is placed either face up or face down over case section 202, one hole 219 will align with one sound hole 210.

Speaker 108 is located in case section 202 in upper region 222 of case section 202. Upper region 222 is generally underneath recess 208 and is bounded by internal structures in case section 202. Such structures include top wall 224, bottom wall 226 and side walls 228. The top surface of speaker 108 abuts against an internal lip at the top edge of walls 224, 226 and 228 to precisely provide an installed location for speaker 108 within region 222. The external dimensions of upper region 222 are provided to allow speaker 108 to fit snugly therein. Preferably, speaker 108 is mated to a rubber boot to assist in securely holding speaker 108 within upper region 222 and to block acoustic leaks around it.

Speaker seal 230 is provided to provide an acoustic seal in a cavity around speaker 108. It is located underneath speaker 108. Speaker seal 230 has opening 232 to allow electrical contacts of speaker 108 to engage with a PCB below it (not shown). Further detail on speaker seal 230 is provided below.

In case section 202, two acoustics cavities are provided around speaker 108 and upper region 222. Preferably, a front cavity located above speaker 108 and sound holes 210 define a Helmholtz resonator to tune high frequencies of speaker 108. Preferably, a back cavity is located behind speaker 108 and provides tuning for its lower frequency response.

The front cavity is defined in case section 202 by a volume including L-shaped cavity 232 and oblong cavity 234 and its sides and bottom surfaces are defined within case section 202. L-shaped cavity 232 and oblong cavity 234 are located immediately to the right and left of region 222, respectively. Notches 236 in side walls 228 connect L-shaped cavity 232 and oblong cavity 234 to a volume above speaker 108 to create a continuous volume for the front cavity. The bottom of the front cavity is defined by moulded floors in L-shaped cavity 232 and in oblong cavity 234 and by the top surface of speaker 108. The top of the front cavity is defined by the bottom surface of display cover tape 218. For the front cavity, tape 218 provides an acoustic seal between cover 110 and case section 202. It will be appreciated that display cover 110 provides additional structural support for the top of the front cavity. It will be appreciated that having a single piece to cover both display 104 and speaker 108 also provides a cost-effective component for device 100, as its part count is reduced.

The back cavity is defined in case section 202 by a volume including: box cavity 238, located immediately to the left of region 222; L-shaped cavity 240, located immediately to the right of region 22; and a volume directly beneath speaker 108. The sides and top surfaces are defined within case section 202. The top boundary of the back cavity is defined by the surface underneath floor of oblong cavity 234, the surface underneath floor of L-shaped cavity 232 and the bottom surface of speaker 108. The perimeter of the back cavity is defined by bottom wall 226 and the collective perimeters of box cavity 238, L-shaped cavity 240 and speaker 108. The perimeter is comprised in part by lower wall 224 and other wall extrusions descending inwardly from top wall 224. More specifically the perimeter is defined by the shape of L-shaped cavity 240, speaker 108 and box cavity 238. The bottom boundary of the back cavity is defined by bottom edge 242 of the perimeter defined by the end of lower wall 224 and the end of the other wall extrusions. Seal 230 is shaped to cover the perimeter defined by the bottom edge 242 and fits snugly thereagainst. When device 100 is fully assembled, a PCB 233 is snugly fit against seal 230 and the PCB 233 defines the bottom wall of the back cavity.

In the back cavity, bleed hole 246 is located in the ceiling of box cavity 238 and provides an air connection to an intermediate cavity 248 located about the front cavity. Preferably, intermediate cavity 248 is located in a front portion of case section 202 and its sides and bottom surfaces are defined within case section 202. Intermediate cavity 248 provides a port through display cover 110 via sound hole 210 located in the upper left of the recessed area 208. Bleed hole 246, intermediate cavity 248 and sound ports 210, provides further tuning of the acoustics using the front and back cavities. In other embodiments, the size, shape and location of a bleed hole can be modified relative to the top and back cavities to effect different acoustic tuning characteristics. The top of the intermediate front cavity 248 is defined by the bottom surface of display cover tape 218. For intermediate cavity 248, tape 218 provides an acoustic seal between cover 110 and case section 202. It will be appreciated that display cover 110 provides additional structural support for the top of the intermediate cavity.

It will be seen that in the embodiment, adhesive tape 218 provides an acoustic seal so that sounds from internal cavity 248 do not leak into any of upper region 222, L-shaped cavity 232 and oblong cavity 234.

It is preferable that the front cavity and intermediate cavity 248 are isolated from each other. As such, the location and dimension of their respective sound holes 210 in case section 202 and holes 219 in tape 218 are preferably made such that for each cavity, its associated sound hole 210 and hole 219 do not overlap with the either of the sound hole 210 or the hole 219 for the other cavity.

A notable feature of the embodiment is that display cover 110 forms part of the front cavity and part of intermediate cavity 248. By sealing display cover 110 to areas of case section 202 with double sided adhesive tape 218, the front cavity and intermediate cavity 248 are created, eliminating the need for use of an extra part.

The embodiment also has a small hole (not shown), approximately 0.75 mm diameter, through the PCB 233 directly behind the speaker 108. The hole is used to further tune the frequency response for speaker 108. The hole is covered with an acoustic mesh (e.g., a woven polyester material) to provide acoustic resistance and control resonance characteristics of the hole. Other types of mesh may be used or smaller holes could be drilled in the PCB 233 to produce different acoustic characteristics. In other embodiments mesh may be placed over one or more of sound holes 210. A nearly acoustically transparent mesh (i.e., a mesh having a very low acoustic resistance) may be sued on sound holes 210 to prevent debris from entering device 100 through sound holes 210.

Other embodiments may use other shapes for their front and back cavities and may dispense with one or both of the cavities.

While the embodiment defines display cover 110 as being generally rectangular, in other embodiments, the display cover can be any shape and size, as long as it covers both the display region and the speaker of the communication device. Further, if the display and the speaker are not on the same face of a device, the display cover can be shaped to bend at the interface line between the two faces and cover both the display and the speaker.

Although the disclosure has been described with reference to certain specific embodiments, various modifications thereof will be apparent to those skilled in the art without departing from the scope of the disclosure as outlined in the claims appended hereto.

The invention claimed is:

1. A cover system comprising:
   a first cover having
     a shape to fit in a recessed region of a case of a communication device, the recessed region bounding a display opening and a speaker opening in the case;
     a first region adapted to cover the display opening;
     a second region to enclose the speaker opening; and
     at least one hole in the second region to provide a conduit between the first cover and speaker opening; and
   a second cover for covering the second region, the second cover having an outer perimeter that is shaped complementary to a shape of the second region, the second cover to allow ambient air to pass around said second cover to said at least one hole.

2. The cover system as claimed in claim 1, wherein:
   the first cover defines a sound hole located about the second region, the sound hole extending from a top surface through the first cover to a bottom surface and connecting to an enclosure cavity; and
   the second cover is further shaped to allow passage of air from above the second cover to the sound hole.

3. The case as claimed in claim 1, wherein the second cover only covers the second region of the first cover and does not cover the first region.

4. A cover system comprising:
   a first cover having:
     a shape to fit in a recessed region of a case of a communication device, said recessed region bounding a display opening and a speaker opening in the case;
     a first region adapted to cover the display opening;
     a second region to enclose the speaker opening; and
     at least one hole in the second region to provide a conduit through the first cover to the speaker opening; and
   a second cover for covering the second region, the second cover being shaped to allow ambient air to pass around the second cover to the at least one hole, wherein the first cover does not cover an opening for a keypad in the case.

5. A cover system comprising:
   a first cover having:
     a shape to fit in a recessed region of a case of a communication device, said recessed region bounding a display opening and a speaker opening in the case;
     a first region adapted to cover the display opening;
     a second region to enclose the speaker opening; and
     at least one hole in the second region to provide a conduit through the first cover to the speaker opening; and
   a second cover for covering the second region, the second cover being shaped to allow ambient air to pass around the second cover to the at least one hole, wherein the second region has a recess extending inwardly from a top surface into the first cover.

6. The cover system as claimed in claim 5, wherein the recess has a hexagonal shape.

7. The cover system as claimed in claim 5, wherein the second cover is shaped to fit the said recess.

8. A case for communication device, the case comprising:
   a frame having sides and an internal wall spanning between the sides, the frame having a shape defining a first opening for a speaker and a second opening for a display, the first and second openings separated by the internal wall, the frame further defining a first cavity providing acoustic tuning for the speaker, the internal wall further defining a second cavity about the second opening providing further acoustic tuning for the speaker, wherein in the frame, the internal wall includes a first air channel connecting the first cavity to the second cavity and the frame defining a second air channel connecting the first cavity to a region below the speaker.

9. A case for communication device, the case comprising: a frame having sides and an internal wall spanning between the sides, the frame having a shape defining a first opening for a speaker and a second opening for a display, the first and second openings separated by the internal wall, the frame further defining a first cavity providing acoustic tuning for the speaker, the internal wall further defining a second cavity about the second opening providing further acoustic tuning for the speaker, wherein the second opening is covered by a printed circuit board (PCB) when the PCB is assembled with the frame.

10. The case as claimed in claim 9, wherein the first cavity is a Helmholtz cavity.

11. The case as claimed in claim 9, further comprising a recess positioned around the first and second openings.

12. The case as claimed in claim 11, further comprising a first cover providing a part of a front face of the communication device.

13. The case as claimed in claim 12, wherein the first cover has:
   a shape to fit in the recess;
   a first region adapted to cover the first opening;
   a second region to enclose the second opening; and
   at least one hole in the first region to provide a conduit between the first cover and the speaker opening.

14. The case as claimed in claim 13, further comprising a second cover for covering the first region.

15. The case as claimed in claim 14, wherein the first cover defines a sound hole located about the first region, and the second cover is further shaped to allow passage of air from above the second cover to the sound hole.

16. The case as claimed in claim 15, wherein the first region has a recess extending inwardly from a top surface into the first cover.

17. The case as claimed in claim 16, wherein the recess has a hexagonal shape.

18. The case as claimed in claim 17, wherein the second cover is shaped to fit the recess.

* * * * *